Patented Dec. 16, 1924.

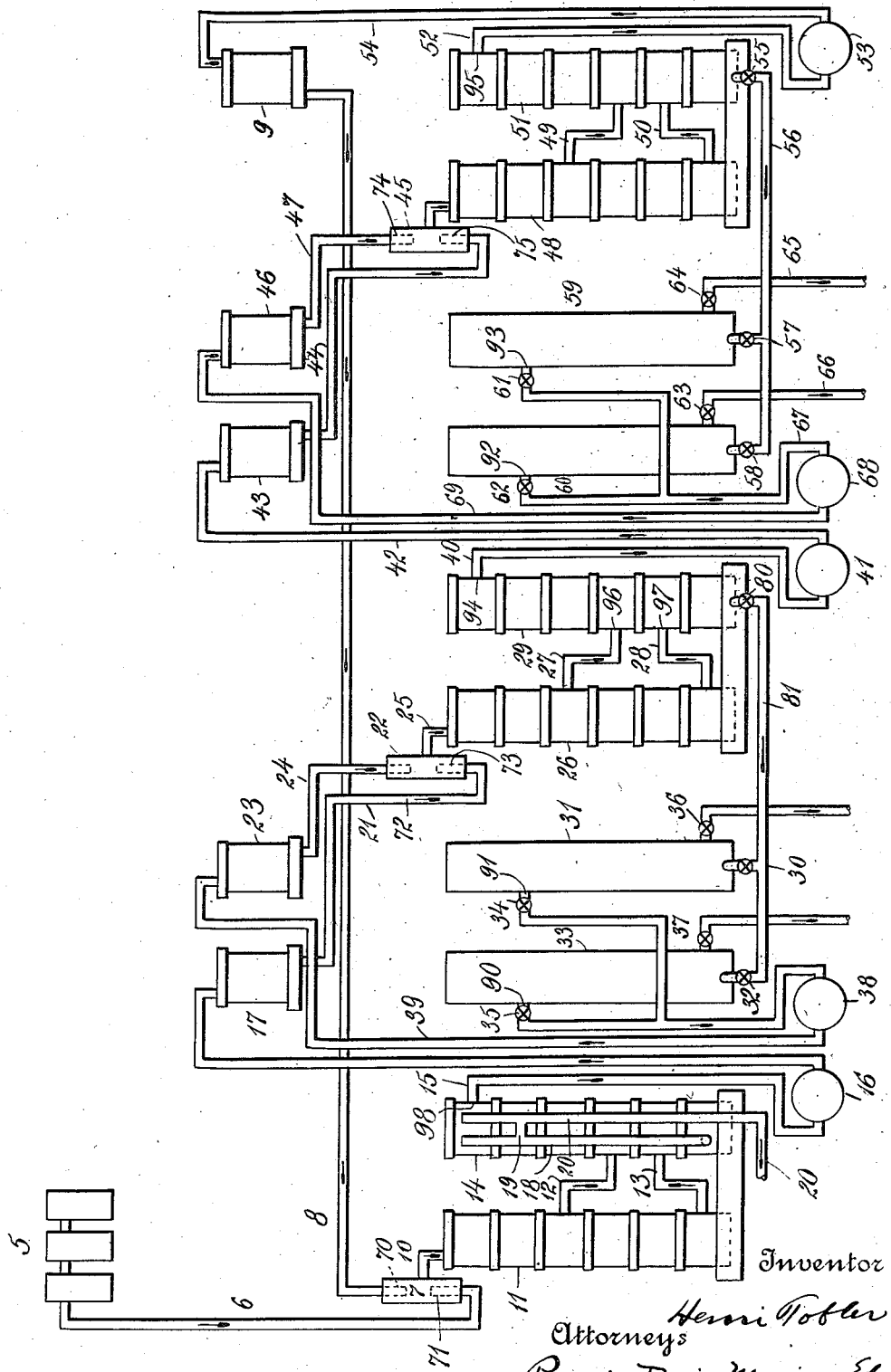

1,519,642

UNITED STATES PATENT OFFICE.

HENRI TOBLER, OF HACKENSACK, NEW JERSEY, ASSIGNOR TO AMERICAN BROMINE COMPANY, OF MAYWOOD, NEW JERSEY, A CORPORATION OF NEW JERSEY.

APPARATUS FOR THE EXTRACTION AND RECOVERY OF BROMINE.

Application filed December 27, 1920. Serial No. 433,316.

*To all whom it may concern:*

Be it known that I, HENRI TOBLER, a citizen of the United States, residing at Hackensack, in the county of Bergen, State of New Jersey, have invented certain new and useful Improvements in Apparatus for the Extraction and Recovery of Bromine; and I do hereby declare the following to be a full, clear, and exact description of the invention, such as will enable others skilled in the art to which it appertains to make and use the same.

This invention relates to the treatment of a fluid with a succession of fluids of different specific gravity and the separation of such fluids from the first named fluid, and more specifically to the extraction of halogen such as bromine from brine and the recovery of the extracted halogen in any desired form such as free halogen or as halide salt, and is directed to the provision of an apparatus by means of which the extraction and recovery of the halogen may be carried out in an efficient and economical manner.

In my Patent No. 1,380,851, granted June 7, 1921, a process is described for extracting halogen from brine and recovering the extracted halogen in the form of a halogen compound of an alkali metal. In this process oxidized brine containing free halogen is thoroughly mixed with an oil to extract the free halogen from the brine. The mixed liquids are brought into a quiescent condition and allowed to separate under the influence of gravity into an upper oily layer containing the extracted free halogen and a lower aqueous layer containing the spent brine. The extracted halogen dissolved in the oil is purified by bringing the oil containing the dissolved halogen into intimate contact with a purifying solution which extracts the impurities from the halogen. The oil containing the purified halogen is then treated with caustic solution to extract the halogen from the oil (which is recovered for further use) and to convert the halogen into a salt such as sodium halide or sodium oxyhalide.

The immediate object of the present invention is to provide means for rapidly and economically effecting the various steps of the process described, to the end that the entire operation may be conducted in an efficient and commercially successful manner.

Because of the particular design and construction of the different parts of the apparatus and also because of the special arrangement and grouping of these parts with respect to each other, the apparatus is especially well adapted to carrying out the manufacture of halides and the like from natural brines, with a minimum expenditure of labor and at low cost. The arrangement of parts permits continuous operation without expensive shut-downs for purification or regeneration of used solutions, or for replacements; and the design and arrangement of the devices for mixing and separating the oil and the different solutions is such that these essential steps of the operation can be carried out in a continuous manner without interruption and without expensive labor.

The entire apparatus for mixing, separating and transporting the highly corrosive aqueous and oily liquids containing free halogen is free from any complicated mechanism which would become fouled, corroded or broken and which would be difficult and expensive to cleanse or replace. This very simplicity of design and freedom from any complicated or intricate mechanism is a very important feature of the invention. There are no moving parts whatever in the mixing or separating chambers, as will presently appear more clearly when the apparatus is described in greater detail, yet the mixing of aqueous and oily liquid is exceptionally thorough and their subsequent separation is exceptionally complete. The apparatus thus admirably fulfills the essential conditions which must be met in this process for commercial success, namely, a high efficiency of extraction of the halogen and a minimum loss of oil containing dissolved halogen. Moreover by utilizing the invention both the mixing and the separation of the aqueous and the oily liquids are carried out with exceptional rapidity, for operations of this character, thus greatly contributing to the low cost of treatment of the brine.

The construction as well as the advantages and objects of the invention will be more clearly understood by reference to the accompanying drawing diagrammatically illustrating an apparatus adapted for use in practicing the process described.

Referring to the drawing, a pipe 6 conducts the oxidized brine containing liberated halogen from the oxidizing apparatus 5, which may be of any usual or desirable character, to the first mixing chamber 7, where the brine containing the liberated halogen is intimately and continuously mixed with the oil for bringing about the extraction of the free halogen from the brine. The oxidizing apparatus 5 forms no part of the present invention, but is included in the drawing in order that the invention may be more readily understood. The invention may be applied to the treatment of any brine whatever containing free halogen in solution or in suspension and any convenient means may be employed for liberating the halogen from the brine, prior to treatment in accordance with the invention. For example, the raw brine may be oxidized in the electrolytic cells described in the co-pending application Serial No. 249,761, or by means of free chlorine in any form of apparatus suitable for this purpose.

The oil used to extract the liberated halogen from the oxidized brine enters the mixing chamber 7 through a pipe 8, from a storage tank 9. The oil may have been previously used for extracting halogen and recovered in a manner to be hereinafter described. Fresh unused oil may be added to the recovered oil in tank 9 to make up losses or for any other purpose.

The oil and the oxidized brine enters the mixing chamber 7 through the oppositely disposed nozzles 70 and 71 as indicated in the drawing. Thus the two opposing streams of liquid, one aqueous and the other oily, are caused to impinge against each other inside the mixing chamber proper. A very thorough mixing or intermingling of the two mutually insoluble liquids thus takes place in a continuous and rapid manner, thereby promoting the efficient and economical extraction of the liberated halogen from the brine by means of the oil in which the halogen is more copiously soluble than in the brine.

One of the important features of the invention has to do with means for the maintenance of a substantially constant pressure upon the two streams of mutually insoluble liquids which impinge upon each other from opposite directions. This highly desirable steady pressure for each liquid is attained preferably by conducting the respective liquids by gravity flow, each from a storage tank situated a suitable distance above the mixing chamber, as indicated in the drawing. The arrangement described is preferable to any arrangement whereby either liquid is delivered to the mixing chamber directly from any ordinary type of mechanical pump, since many of these pumps deliver a liquid under fluctuating or pulsating pressure, whereas as previously stated, a substantially steady pressure is desirable for the best operation of the simple type of mixing apparatus which is an important feature of the present invention.

It will be understood that special types of pumps well known to engineers and designed particularly to produce the desired steady pressure may nevertheless be employed for delivering the two mutually insoluble liquids to the mixing chamber with very satisfactory results and that the invention comprehends the use of such pumps, to replace the simpler arrangement of gravity tanks shown in the drawing. Because of their greater first cost and cost of maintenance, pumps are much less desirable for the purposes of the present invention than the gravity tanks shown in the drawing.

The intimate mixture or mutual suspension of the oil (which now contains most of the free halogen in solution) and the exhausted brine flows from the mixing chamber 7 through a pipe 10 into a stratifying tank 11 where a partial separation of the two mutually insoluble liquids takes place, under the influence of gravity. Thence the two partially separated liquids flow through pipes 12 and 13 into a settling tank 14 where complete separation of the oil from the brine takes place under the influence of gravity. The pipe 12 is given a downward trend and the pipe 13 an upward trend for the purpose of aiding somewhat in the more complete separation of the two liquids. The sharp turns in these pipes as shown also aid to a certain extent in breaking up the suspension or emulsion of the two liquids and promoting a more complete separation.

After the complete separation of the brine from the oil in the settling tank 14, the oil containing the dissolved free halogen flows off through a pipe 15 to a pump 16 whereby it is delivered to a storage tank 17; whereas the spent brine from which the halogen has now been removed gradually rises through a pipe 18, which is placed outside the tank as shown and which is open at both the lower and the upper end. After the spent brine has risen to a certain level it flows out through a horizontal connecting pipe 19 into a pipe 20 and thence to waste. Both the pipes 18 and 20 are open at their upper ends and extend above the surface of the liquid to prevent a siphon effect.

The oil containing the extracted free halogen, such as bromine, flows by gravity from the tank 17 through a pipe 21 into a second mixing chamber 22, where it is intimately and continuously mixed with an aqueous solution such as a bromide solution, which extracts certain impurities, such as chlorine, from halogen in the oil. The operation of the mixing chamber 22 is exactly similar to that of the first mixing chamber 7, as already described, the aqueous solution used for purifying the halogen as just described flowing by gravity into the mixing chamber from a storage tank 23 through a pipe 24.

The mixture of oil and aqueous solution flows from the mixing chamber 22 through a pipe 25 into a stratification tower 26 where a partial separation takes place and thence through pipes 27 and 28 into a settling tower 29 where complete separation of the oil and aqueous solution occurs. The operation of the settling towers 26 and 29 is entirely similar to that of towers 11 and 14 already described except that there is no arrangement for automaticaly draining off the aqueous solution by means of pipes similar to the pipes 18 and 20 of tower 14, although obviously such an arrangement may be employed if desired at tower 29 also. In either event the completely separated aqueous solution is transferred, by any convenient means through valve 80 and pipe 81 either through a valve 30 into the storage tank 31 or through a valve 32 into storage tank 33, as desired. The purpose of the two storage tanks 31 and 33 is to make it possible to use one of the tanks for storage, whilst the other is drained so that it may be cleaned and the used solution purified and made up to constant strength, for re-use.

If, for example, it is desired to clean tank 31 and purify and regenerate the used aqueous solution therein, valves 30 and 34 are closed, and valve 32 opened so that the aqueous solution from the settling tower 29 can pass directly into the storage tank 33. The used impure solution in 31 can then be drawn off through a valve 36 for cleaning and regenerating and the tower itself may be cleaned without interrupting the main operation. It will be obvious from the drawing how a similar manipulation will enable tower 33 to be emptied without interrupting the operation of tower 31.

The used solution such as bromide solution is drawn off from tower 31 or 33 through valves 34 or 35, depending on which tower is in use, into a pump 38 and thence forced through a pipe 39 into the storage tank 23, thus completing the cycle of its flow through those parts of the apparatus in which the purification of the extracted halogen such as bromine dissolved in the oil is carried out. The separated oil containing the purified halogen in solution is drawn from the tower 29 through pipe 40 into the pump 41 and thence forced through a pipe 42 into an elevated storage tank 43.

From the tank 43 the oil containing the purified halogen flows by gravity into a mixing chamber 45 and here meets an opposed stream of caustic solution, which flows into the mixing chamber from a tank 46 through a pipe 47. The caustic solution extracts the halogen from the oil converting it into halide and oxy-halide, which dissolve in the aqueous solution.

The separation of the thoroughly mixed aqueous solution containing the dissolved halide and oxy-halide salts from the oil is effected by means of settling towers 48 and 51 which operate in exactly the same manner as towers 26 and 29 as already described. The separated aqueous solution is conducted to storage through a pipe 56 into either one of two storage tanks 59 and 60 as desired. These two storage tanks 59 and 60 and pipes 65 and 66, 67 and 56 connecting therewith together with valves 57, 58, 61, 62, 63 and 64 are operated in exactly the same manner as are the tanks 31 and 33 with their corresponding connections, as hereinbefore described.

The aqueous solution containing the dissolved halide and oxy-halide is transferred by means of a pump 68 and connecting pipes 67 and 69 to the elevated storage tank 46, thus completing the cycle of its flow through those parts of the entire apparatus in which the recovery of the halogen from the oil is carried out.

It will be understood that this cycle of operations is repeated with the same batch of solution until the latter becomes sufficiently rich in halogen compounds for treatment by any of the known processes for recovering halogen from such solutions in the form of a solid salt, such as sodium bromide for example. When the solution has thus become sufficiently rich in halogen compounds it is led off from the particular storage tank (59 or 60) in use at the time through the valve 64 and pipe 65 or through valve 63 and pipe 66 as the case may be, into the refinery plant not shown in the drawing and not a part of the present invention, where it is worked over into solid salt such as sodium bromide, for example, which is a marketable form of the product.

The separated oil, from which the halogen has been completely removed by the alkali solution, as described, is drawn off from the upper portion of the tower 51 through pipe 52 into the pump 53 whence it is forced through pipe 54 into the elevated tank 9 from which it can be fed again into the first mixing chamber 7, for extracting more bromine from fresh portions of oxidized brine and the entire operation as described again repeated.

It will be understood that the apparatus hereinbefore described is illustrative only for my invention, which may be embodied in other forms of apparatus than the one described and illustrated. For example, as already mentioned, constant pressure pumps may be substituted for the elevated storage tanks 17, 23, 43, 46 and 9 from which the different liquids are fed into the mixing chambers. Likewise, for example, in place of the pumps 16, 38, 41 and 68 in the drawing, so-called "pressure-eggs" or "blow-cases" may be used for lifting the liquids by means of compressed air to the elevated tanks. These "blow-cases" are best made of earthenware for handling the more corrosive liquids, whereas the ones designed for handling the less corrosive liquids may be made of suitable metal.

The tanks 11, 14, 26, 29, 48 and 51 are preferably constructed of earthenware, but other corrosion-resisting material may be used. On the other hand, tanks 33, 31, 60 and 59 are preferably made of a suitable metal, but other material may be used.

It will be understood, also, that the relative heights of the different pieces of apparatus may be varied in such way as to utilize gravity flow in transferring the liquids from place to place in the plant, according to means and methods well known in the art of handling liquids in such cases.

In certain cases it may be advantageous to place the different mixing chambers near the bases of the respective stratification or settling towers, into which the mixed liquids flow from the mixing chambers. This arrangement sometimes results in increased efficiency in the separation of the liquids since in this way the mixed liquids are caused to rise through a vertical pipe (say a six inch pipe) for a considerable height which allows greater time for the liquids to separate under the influence of gravity.

The construction and arrangement of the stratification and settling towers will be seen, on inspection, to be such as to minimize the production of vertical convection currents, in the mixture of liquids, which militate against their complete separation. Thus, the employment of two separate towers for this purpose assists in bringing about this desired result by breaking up these currents. Likewise, the sharp turns in the pipes connecting the two towers aid in producing the same result. Baffle plates may be used for the same purpose.

It has been found that efficient mixing of the different pairs of an aqueous and an oily liquid in the mixing chambers is aided somewhat by constructing and disposing the two nozzles in such way that the area of the curvilinear surface of the imaginary cylinder or prism included between the nozzle orifices considered as ends of the cylinder or prism, is about equal to the sum of the cross-sectional areas of the orifices or ends of said imaginary cylinder or prism. The dimensions of the mixing chamber may be varied considerably, but one in which the walls are relatively near the impinging streams is preferred. Furthermore, the oppositely disposed nozzles may be placed within the stratification tower or first settling tower, either with or without surrounding walls other than those of the tower itself, without departing from the invention.

In order to provide for the continuous and effective operation of the apparatus the heights of the overflow outlets 90, 91, 92 and 93 for the aqueous solutions and of the overflow outlets 94 and 95 for the oily liquids in their relation to the surface of separation of the two liquids within the respective settling towers 29 and 51, are adjusted according to a definite plan.

Thus if the surface of separation between the two liquids in tank 29 is maintained between the two inlets 96 and 97 at a height of 50 feet from the floor and if the specific gravity of the oil is 0.8 and that of the purifying solution 1.1, and if furthermore, the outlet 94 is placed at 100 feet above the floor then the outlets 34 and 35 are placed at a height of 86 feet from the floor. By this means the surface of separation is maintained at any predetermined position within the settling tank, preferably between the two inlets and at the same time the overflow outlets are at such relative heights that an overflow of the separated liquids will take place in a continuous manner without disturbing the position of the surface of separation of the two liquids. The overflow outlets 92, 93 and 95 for tank 51 are arranged in a similar manner, taking into account the somewhat different ratio of the specific gravities of the two liquids being continuously separated in tank 51. Also, of course, the same adjustments are made with respect to the outlets 98 and 19 in relation to the surface of separation in the settling tank 14.

For the purpose of preventing the overflow of the liquids over the top of the settling tank 29 and the storage tanks 31 and 33 in case both the pumps 41 and 38 should cease to operate from any cause, as for example shutting off of the power, the capacity of that portion of tank 29 above the outlet at 94 is made somewhat larger than the total capacity of the elevated storage tank 17 and the capacity of each of the storage tanks 31 and 33 above their respective outlets 91 and 90 is made large enough to hold the contents of tank 23. A similar adjustment is made of the capacity of the upper part of tank 51 with respect to the capacity of tank 43 and also of the capacities of the upper portions of tanks 92 and 93 with respect to tank 46. So also, the capacity of the upper portion of tank 14 above the outlet 98 should be sufficient to hold the contents of tank 9.

As the non-miscible liquid for use in dissolving the freed halogen from the oxidized brine, I prefer to use a light hydro-carbon, and preferably a saturated light hydro-carbon, having a distribution co-efficient for halogen, such as bromine, with respect to said brine, greater than about 6, and a density differing from that of the brine by more than about 0.2 ($\frac{2}{10}$) referred to the density of water as equal to 1, and also having a viscosity less than about 3 referred to the viscosity of water as unity. I have found that an oil of the character described can be intimately mixed with the brine with a minimum of agitation and that as soon as the agitation ceases it will separate rapidly from the brine without emulsification or solution of the brine, and will extract the halogen from the brine with a high degree of efficiency, thus making it practicable to carry out the extraction in a continuous manner as described with the use of a relatively small volume of oil. Such a material can be obtained in a practical way by collecting those portions of a crude oil of the Pennsylvania type which is distilled between 110° and 160° C., or by distilling this fraction from a gasolene which has been obtained from such a crude, without the use of a cracking process, or any process producing large amounts of unsaturated hydrocarbons.

This fraction contains a small amount of unsaturated hydro-carbons, generally less than 1%, and this I dispose of by direct saturation with bromine (during which operation a small amount of hydrobromic acid is formed) and then washing by agitation with a 10% solution of caustic soda, whereby hydrobromic acid is removed and some resinous matter contained in the oil is separated. The oil is then ready for use as the absorbing or non-miscible liquid of the present process.

I claim:—

1. In an extraction apparatus adapted for continuous operation, a mixing chamber provided with opposed nozzles for mixing immiscible liquids of different specific gravities, and a plurality of settling tanks connected therewith.

2. In an extraction apparatus, a plurality of mixing chambers having gravity fed opposed nozzles for mixing liquids of different specific gravity and a plurality of interconnected settling tanks connected with each of the said mixing chambers, for separating the liquids mixed thereby.

3. In the extraction apparatus of claim 1, the combination of a plurality of the mixing chambers with a plurality of sets of the connected settling tanks.

4. In the apparatus of claim 1, a plurality of mixing chambers for mixing immiscible liquids of different specific gravities, each chamber being connected with a plurality of settling tanks and means for delivering one of said liquids from the settling tanks to the succeeding mixing chamber.

5. In an extraction apparatus of the class described, a plurality of settling tanks provided with a plurality of connecting pipes between adjacent pairs thereof and disposed at different levels thereof in such manner that each of the connecting pipes connects the joining tanks of the pair at slightly different levels thereof.

6. In an extraction apparatus for separating halogen from natural brine, the combination of a pair of gravity-fed opposed nozzles, and a gravity-controlled separator.

7. In an apparatus of the class described, a mixing device comprising a casing having diametrically opposed nozzles, and means for supplying fluids of different specific gravity to the nozzles under a constant head.

8. In apparatus of the class described, a mixing device comprising a casing, and means for supplying to the casing under pressure fluids of different specific gravity in diametrically opposed streams impinging one against the other.

In testimony whereof I affix my signature.

HENRI TOBLER.